2,846,314

CONFECTIONARY PRODUCT

William J. Aichele, Chatham, and Walter W. Davenport, Hoboken, N. J., assignors to General Foods Corporation, White Plains, N. Y., a corporation of Delaware No Drawing. Application October 26, 1955
Serial No. 543,016

15 Claims. (Cl. 99—139)

This invention relates to a whipped topping or icing for use with baked goods, and more particularly, to dry mixes for use in preparing such toppings.

Toppings which are subjected to whipping during preparation generally are divided into two classes. The first comprises whipped emulsions of fat and water such as whipped cream. The second comprises toppings which depend on the whippability of materials such as egg white. It is with this latter class of toppings or icings that the invention is primarily concerned.

The basic ingredients of toppings of this nature are sugar, water, and a whippable protein such as egg white. In the course of preparation the whippable material is violently agitated in the presence of water so that a large volume of air is incorporated into the mixture and a stiff foam produced. In some cases it is desirable to whip the mixture in the presence of a small amount of sugar and accordingly a topping commonly known as meringue is produced. If a decorative icing for cakes and the like is desired, an additional amount of sugar, generally in the form of a heated syrup, is gently folded into the whipped foam thus providing an icing of good texture and body. A well known example is the "7 minute" type of frosting.

Important disadvantages to the use of the above type of icing are the painstaking procedure required for its preparation and the problem of disposing of unused egg yolks. By nature, the egg white foam is delicate and unstable. While the sugar may be added in the more convenient dry granulated form, a sugar syrup is generally employed to provide a smooth textured product. The addition of sugar to the foam, particularly in syrup form, must be accomplished at a very slow and uniform rate lest the foam collapse and the resulting icing become completely unacceptable. In addition, a controlled amount of heat must be applied at some point in the preparation to coagulate the egg white to the proper consistency, and to impart strength to the foam.

A further disadvantage in the use of this type of icing is its instability after it has been applied to a particular article of baked goods. For example, when a cake is decorated in the usual manner with an egg white type of icing, the foam structure of the icing is likely to break down within 24 hours and the water contained therein will slowly migrate into the cake. Because of this, the cake directly beneath the icing becomes unacceptably moist and soggy.

It is an object of the present invention to provide a topping or icing of the type described which will be extremely simple to prepare.

Another object is to provide a topping or icing of the type described which has greatly improved stability after application.

A further object is to provide a topping or icing of the type described which requires no heating in the course of preparation.

A still further object is to provide a dry composition which on reconstitution with water and whipping will provide an icing possessing the above mentioned desired characteristics.

These and other objects will become apparent from the following detailed description of the invention.

It has now been discovered that an icing or topping of the type described having greatly improved stability and texture is provided by employing a composition including a water soluble non-ionic alkyl ether of cellulose and a whippable protein as the whippable material therein. Such a mixture in the presence of water may be whipped to a foam which is capable of holding the additional materials required to provide an icing or topping, and the icing or topping thus produced is greatly superior in texture and stability over icings presently available.

The use of whippable proteins as basic whipping agents for topping compositions is, of course, well known. Also, the ability of the water soluble non-ionic alkyl ethers of cellulose to whip in aqueous solution has been established. This is described, for example, by Schmalfuss et al., in an article on "The Ability of Sugar Solutions to Retain Gas Bubbles in the Presence of Colloids," Kolloids Z, 166, 161–170 (1950). In this article, the ability of several cellulose ethers to form stable foams with sugar syrups is described, with methyl cellulose providing the best foam.

The present invention, however, uses a combination of the whippable protein and cellulose ether to provide results which are not obtained when either material is used alone. To illustrate this, an icing based on the whipping ability of a whippable protein alone provides an icing of good volume but which at the same time suffers from extreme instability and a frothy texture. This icing breaks down on standing, with a large amount of syneresis or weeping. When applied to a cake or similar food material, the cake becomes soggy within a very short time. Various well known stabilizers such as the alginates, pectin, and the like have been employed to some advantage for icings based solely on whippable proteins, but the aforementioned difficulties have not been overcome.

Where the icing is solely based upon the water soluble non-ionic alkyl ether of cellulose as a whipping agent, an icing of good stability is obtained. This icing, however, has a very poor volume bordering on the range of acceptability, and the texture is stiff and considered unacceptable. Increasing the level of the cellulose ether tends to increase the volume, but in this event, the texture becomes even more stiff and gummy.

A combination of these two materials, however, as the basic whipping material for an icing has been found to result in the realization of the advantages attributed to each of the above mentioned whipping agents while avoiding, at the same time, the disadvantages of these materials. In this manner, an icing having exceptionally fine volume, stability, and texture is provided.

The water soluble non-ionic alkyl ethers of cellulose which have been found to function according to this invention include ethyl cellulose, methyl cellulose, methyl ethyl cellulose, hydroxy propyl methyl cellulose, and hydroxy ethyl cellulose. The limitation "non-ionic" is meant to expressly exclude the ionic cellulose ethers, such as carboxy methyl cellulose, carboxy methyl hydroxy ethyl cellulose, and their salts, which do not form a foam in aqueous solution and which accordingly do not function according to this invention. While all of the water soluble non-ionic alkyl ethers of cellulose function equally well according to this invention, methyl cellulose is preferred because of its ready availability. For the sake of convenience, the various embodiments of this invention described hereinafter will be in terms of methyl cellulose, although the scope of the invention should not be so limited.

The cellulose ethers described above are generally prepared by the introduction of functional groups into the cellulose molecule by various well known procedures. Water solubility, viscosity, hygroscopy and other characteristics of the cellulose ethers vary according to the degree of substitution, length of the substituted chain, uniformity of substitution, and the nature of the functional group introduced.

The cellulose ethers are produced in varying degrees of viscosity. For example, the preferred methyl cellulose is commercially available in viscosities ranging from 15 to 4,000 centipoises, and materials of different viscosities may be intermixed to provide any viscosity desired. Generally, it is preferred to employ a cellulose ether having a relatively low viscosity. The cellulose ethers and particularly methyl cellulose having a viscosity in the order of 25–50 centipoises provide the best textured icings, and this viscosity range is therefore preferred.

The cellulose ethers also vary considerably in degree of water solubility and it is thought that only the amount of the cellulose ether which goes into solution contributes to a foam when the solution is whipped. For example, an ethyl cellulose which is reported to be soluble only to the extent of 25% in water at room temperature will not produce a foam when small amounts of it are whipped. The same ethyl cellulose in the same amount produces a satisfactory foam, however, when whipped with water at 4° C. where its solubility is reported to be about 60%. The best results are obtained with those forms of cellulose ethers which have an apparent solubility of 100% in water at room temperature. The following discussion concerning the cellulose ethers assumes either complete solubility or relates only to that portion of the cellulose ethers which will go into solution.

The term water solubility as used herein refers to dispersibility in general and includes colloidal dispersion and the like. Moreover, solubility as used herein is to be considered according to the use conditions of the invention. Methyl cellulose, for example, is reported by some authors to be completely dissolved only after a 24-hour soaking period. Under the conditions prescribed herein for preparing a topping or an icing mix, the same methyl cellulose is completely dissolved for all intent and purposes after the violent agitation used to provide the whip.

The whippable proteins which may be used according to this invention include egg albumen, gelatin and modified gelatins, various hydrolyzed casein materials such as casein hydrolyzed with trypsin to 10% hydrolysis, various hydrolyzed soy proteins, fish albumen, gliadin, whey solids, and the like. Of these materials, best results are obtained with soy protein which has been hydrolyzed with pepsin to from 10 to 18% and this material is preferred. The percent hydrolysis refers to the percent of total nitrogen which has been converted to amino nitrogen during hydrolysis. Total nitrogen is determined by the Kjehdahl method and amino nitrogen is determined by the method described in David M. Greenburg's "Amino Acids and Proteins," Charles C. Thomas, Springfield, Illinois (1951), pages 80, 81 and 246. The analysis of a typical partially degraded soy protein which is employed is as follows:

| | Percent |
|---|---|
| Total nitrogen | 9.9 |
| Amino nitrogen | 1.1 |
| Ash | 13.4 |
| Moisture | 4.6 |
| pH (1% solution) | 5.5 |

The cellulose ether and the whippable protein may be employed in varying amounts and varying ratios of each, depending to some extent on the individual effectiveness of the cellulose ether or protein as a whipping agent. In the case of the preferred material, methyl cellulose having a viscosity of about 25 centipoises, and the preferred partially hydrolyzed soy protein described in the preceding paragraph, a range of ratios of protein to methyl cellulose from 7:3 to 1:9 parts by weight, where the total whippable material is employed at a level from 0.5% to 4% of the total dry solids of the topping, is preferred.

Use of the whipping composition of this invention in an icing mix employing a 2-stage preparation requires a lower level of whippable material than that of a mix which is prepared in one stage. This is due to the fact that the presence of the total amount of solids during the initial whipping of the composition makes foam production more difficult and thus, a high level of whipping material is required for optimum results. In a mix compounded for 2-stage preparation, a level of 0.8% of the total dry solids of the above preferred mixture is preferred, while with 1-stage, a level of 3.2% is best.

The concentration of the whipping composition in aqueous solution must also, of course, be considered. Where an icing mix employing a 2-stage preparation is compounded, a level of whipping composition sufficient to provide a 1.3% solution on reconstitution with the required amount of water has been found to provide optimum results and is preferred. A mix adapted for 1-stage preparation, on the other hand, requires an amount of the whippable material sufficient to provide a 3.5% solution on reconstitution with the required amount of water, for optimum and preferred results. Solutions of a low concentration provide a weak foam which is unable to support a quantity of solids sufficient to provide a topping of the desired texture and stability, while a highly concentrated solution of whipping composition provides a product which is highly viscous, and unacceptable as an icing.

Although a whip can be prepared using cellulose ether, whippable protein and water alone, it is much preferred that a small amount of a compatible edible diluent such as sucrose be present with the cellulose ether to prevent lumping when the latter is contacted with water prior to being whipped. In the absence of an edible diluent, the whip is not uniform, is difficult to handle, and is somewhat lumpy. The term compatible edible diluent as used throughout the specification refers to materials which have little or no adverse effect on the foam and include materials such as sucrose, dextrose, fructose, lactose, maltose, levulose, raw and gelatinized starches, dextrains, and the like. Of these, sucrose is preferred because of its superior sweetening ability.

Where sugar is employed as the compatible edible diluent, the particle size employed at the time of whipping is not critical except that sucrose of very fine particle size tends to cake in the package under normal storage conditions, causing difficulty in dispersion. Accordingly, it is preferred to use a regular granulated sugar.

The major part of the total sugar used is generally added to the stiff foam in the second stage of preparation. This sugar is mixed into the foam so that the necessary body and sweetness is imparted to the icing. At the same time, a large proportion of the air entrapped in the foam is retained. In order to obtain a smooth textured icing free from graininess, it is preferred that commercial 6X sugar be employed having a particle size of approximately 97% through 200 mesh. It is recognized, of course, that other forms of sugar including syrup may be used, depending on the desired texture and other characteristics. Likewise, all the sugar to be used may be present when the composition is whipped, in which case, as aforementioned, a greater amount of whippable material should be used and either 6X sugar or granulated sugar may be employed.

Any of the materials ordinarily used as foam stabilizers such as sodium alginate, other alginates, pectin, agar, Irish moss, carboxymethyl cellulose, gum tragacanth, gum acacia, and the like, may be used with the whippable material and sugar during whipping, or, added after whipping. These materials are used to impart strength to the delicate foam structure formed during whipping and help to retain the entrapped air. The amount of such foam stabilizers required ranges up to about 1 part by weight in 100 parts by weight of total solids in the completed whipped topping. Where, for example, a combination of sodium alginate, a soluble calcium salt, and a phosphate buffer is employed as a foam stabilizer, 0.2–0.6 part by weight of this combination in 100 parts by weight of total solids in a two stage icing generally gives the best results and is preferred. In this case, the soluble calcium salt reacts with the soluble alginate to form a gel complex of calcium and sodium alginate and the buffer is employed to restrain gel formation for a time sufficient to allow whipping to take place before the gel is established.

In order to further insure a pH which is optimum for the setting of this stabilizing agent, cream of tartar, citric acid, tartaric acid or other acid reacting material may be used. In this manner, the firmest set is obtained. Amounts of these materials sufficient to adjust the pH of the composition to within the range of 4–5.5 are generally employed. It is preferred in this case to employ cream of tartar at a level of 0.2–0.3 part in 100 parts of dry solids of the completed icing and in the case of a 2-stage preparation it is preferably added after the foam has been whipped.

The preferred stabilizing system for use in the present invention includes a water soluble alignate, a salt whose cations form a water insoluble salt with alginic acid, and a substance which slowly releases free acid on solution in water. Use of this system provides a topping having improved ease of preparation, spreadability, and improved stability. In principle, this stabilizing system is the same as the one discussed in the preceding paragraph. However, by using a controlled rate of hydrogen ion release through the use of a slow acting acid ingredient, gelation of the alginate is apparently deferred for a period of time sufficient to allow a maximum ease of preparation, maximum ease of spreadability, and a lengthening of the stabilizing influence of the alginate to cover a considerably longer period of time. The reason for the improvement here is thought to be related to the formation of a sodium-calcium alginate complex. Where rapidly hydrolyzing acids are employed, the pH is reduced immediately on reconstitution of the mix. This tends to cause a salting out effect and to precipitate an insoluble calcium alginate. The insoluble precipitate does not stabilize the foam structure. On the other hand, where the slowly hydrolyzing acid is employed, it slowly reacts with the calcium salt present to introduce calcium ions into the solution in a slow and uniform manner. This, in turn, facilitates the formation of a sodium-calcium alginate complex in the form of a gel. Apparently, a gel is necessary if the full benefit of the alginate stabilizing system is to be realized.

The avoidance of the salting out effect is also thought to prevent interference of the alginate with the whipping efficiency of the combination of whippable protein and cellulose ether. It has been noted, in support of this, that an increase in volume of foam is obtained where a slowly hydrolyzing acid reacting material is employed.

Examples of the slow acting weakly acidic substances which may be employed include d-glucono lactone and other acid lactones. Alternatively, other weak acids such as acetic, citric, glutaric, lactic, succinic, tartaric, and gluconic may be employed, providing the acid material is coated so that its release is brought about in a slow and uniform manner over a period of time. The final pH obtained, of course, corresponds to the optimum pH range described above.

Along these same lines, the rate at which the prepared topping sets to a firm consistency can be regulated by regulating the rate of release of the calcium salt. In the ordinary course of producing commercial sodium alginate, a calcium salt is included with the alginate before drying. In this manner, the calcium salt is effectively coated so that it is slowly released on reconstitution of the sodium alginate. Use of this material together with the d-glucono lactone provides an icing which sets in about 4 hours after preparation. A mere physical mixing of dry sodium alginate and calcium carbonate, however, provides an icing which is firmly set within 30–60 minutes after preparation. Other methods, of course, may be employed for prolonging the release of the calcium salt, such as coating the salt with other relatively slow dissolving materials.

It is also preferred that the soluble salt of alginic acid which is employed be of a low viscosity type. The alginates are available in a considerable range of viscosities. A high viscosity alginate tends to depress the foam produced by whipping the mixtures of whippable protein and cellulose ether, and also makes the whipping operation more difficult because of the increased viscosity of the solution. The range of viscosities which are preferred are from about 50 centipoises to about 300 centipoises, measured in a 2% solution of the salt of alginic acid.

In topping preparations containing sodium chloride, it has been recognized that a sodium salt of alginic acid at levels normally employed does not function in an acceptable manner, and much higher levels are required to produce satisfactory stabilizing action. In this case, it has been found that a potassium salt of alginic acid does not suffer from the adverse effect of the presence of sodium chloride and may be employed at the usual low level. In compositions containing sodium chloride therefore, it is preferred to employ the potassium salt of alginic acid together with calcium carbonate and d-glucono lactone.

Although sugar is generally employed as the sole edible diluent, various other materials may be added to the topping in small amounts along with the foam stabilizer. For example, finely divided starch may be employed in conjunction with sugar to give additional body and to prevent caking of the sugar in the package during storage. Flavoring materials such as cocoa, powdered coffee, and the like may be included.

An advantage of the icing made in accordance with the invention using the cellulose ether in combination with a whippable protein is its ability to withstand the addition of fatty materials. Many types of non-whipped toppings are made using melted chocolate, melted butter or other fats because of the smooth texture and pleasing flavor which they impart. Use of these materials in whipped icings of this type, however, is extremely difficult because fats are antagonistic to the foam which has geen formed, causing it to collapse. The icings of this invention, however, are more tolerant to the addition of such fats providing they are folded gently into the composition after the foam is developed and after the sugar has been folded in.

Another important advantage concerns the stability of the icings prepared according to the invention. Ordinary whipped icings based on whippable proteins tend to become watery and separate within 24 hours after preparation. Icings prepared in accordance with the present invention do not separate for as long as seven days after preparation. This characteristic is a very valuable one in those cases where the cake to which the icing has been applied is not consumed on the day of preparation.

The compositions of this invention are particularly well adapted for use as dry prepared topping mixes permitting extreme ease of preparation. If the ingredients are to be reconstituted in two stages, the mix is most conveniently packaged as two separately packaged units to be sold together as a complete mix. The first of these packages contains the whipping composition and, if desired, the foam stabilizer, and the sugar as above mentioned. The second package contains the acid reacting material, the additional sugar, and the other desired dry ingredients. The foam stabilizer is effective in either package as aforementioned. Preparation of the icing of the invention packaged as above would involve simply the addition of water to the ingredients of the first package, whipping the mixture to a stiff foam and thereafter mixing into this foam the ingredients of the second package.

It is to be understood that mixtures of the cellulose ethers, the whippable protein and foam stabilizing system may be marketed as such, leaving the addition of other ingredients to the housewife. On the other hand, all of the ingredients required for a complete topping as described herein may be marketed in a single package by making the aforementioned formulation changes. It is generally desirable to leave the addition of the flavoring materials such as melted fats, butter, and the like to the housewife.

The amount of water to be added to the dry composition may vary over a wide area depending on the proportion of the total dry ingredients to whippable material and also on the concentration of whippable material in the reconstituted icing. With the mixes described above and in the examples following, it is preferred that the amount of water comprise from about 25% to about 55% by weight of the completed icing. Icings containing from about 35% to about 50% water are preferred.

The following tables illustrate dry mixes which may be made according to this invention. The first group of examples are devoted to toppings prepared in two stages, while the second group illustrate toppings which are prepared in one stage.

EXAMPLE 1

Part I

| | Wt./package, g. |
|---|---|
| Hydroxy propyl methyl cellulose, Methocel HG, (50 cps.) Dow Chemical Co., Midland, Mich. | 1.4 |
| Sodium alginate (containing 25% calcium carbonate) | 0.9 |
| Partially hydrolyzed soy protein (as hereinbefore described) | 0.9 |
| Coating sugar | 20.0 |

Part II

| | |
|---|---|
| 6X sugar | 270.0 |
| Gelatinized starch (tapioca) | 3.0 |
| Cream of tartar | 0.8 |
| | 297.0 |

EXAMPLE 2

Part I

| | |
|---|---|
| Ethyl cellulose | 2.0 |
| Gliadin (wheat protein fraction) | 1.8 |
| Sodium alginate (containing 25% calcium carbonate) | 0.9 |
| Coating sugar | 39.7 |
| D-glucono lactone | 0.7 |

Part II

| | |
|---|---|
| 6X sugar | 250.0 |
| Gelatinized starch (tapioca) | 10.8 |
| | 305.9 |

EXAMPLE 3

Part I

| | |
|---|---|
| Methyl cellulose (Methocel 25 cps. Dow Chemical Co., Midland, Mich.) | 1.4 |
| Partially hydrolyzed soy protein (as hereinbefore described) | 0.9 |
| Sodium alginate (containing 25% calcium carbonate) | 0.9 |
| Coating sugar | 39.7 |
| D-glucono lactone | 0.7 |

Part II

| | |
|---|---|
| 6X sugar | 242.6 |
| Gelatinized starch (tapioca) | 10.8 |
| | 297.0 |

EXAMPLE 4

Part I

| | |
|---|---|
| Methyl cellulose | 1.0 |
| Partially hydrolyzed soy protein (as hereinbefore described) | 1.2 |
| Sodium alginate (containing 25% calcium carbonate) | 1.0 |
| Coating sugar | 60.0 |

Part II

| | |
|---|---|
| 6X sugar | 250.0 |
| Gelatinized starch (tapioca) | 6.0 |
| Cream of tartar | 1.0 |
| | 320.2 |

EXAMPLE 5

Part I

| | |
|---|---|
| Methyl ethyl cellulose | 1.4 |
| Partially hydrolyzed soy protein (as hereinbefore described) | 0.9 |
| Sodium alginate (containing 25% calcium carbonate) | 0.9 |
| Coating sugar | 39.7 |
| D-glucono lactone | 0.7 |

Part II

| | |
|---|---|
| 6X sugar | 250.0 |
| Gelatinized starch (tapioca) | 10.8 |
| | 304.4 |

In preparing the mixes described above, ¾ cup (180 cc.) of cold water is added to the material of Part I and the mixture whipped in a Sunbeam mixer at Speed No. 10 for 4 minutes. The material of Part II is then blended into the foam of Part I for from 30 to 60 seconds using the mixer at a slow speed. In this manner a topping of excellent handling characteristics and greatly improved stability is provided. The icings prepared from all the examples showed no signs of separating after 72 hours of storage; whereas, a control prepared in the conventional manner with egg white as the whipping material began "weeping" at 15 hours and was completely unacceptable after 28 hours.

If a chocolate flavored icing is desired, 57 grams of melted baking chocolate may be gently folded into the completed icing of the above examples with only slight loss in volume and with the retention of the good handling characteristics of the regular icing. An alternative procedure involves the addition of defatted cocoa to the dry mix.

If the same volume of icing were prepared in accordance with the standard "7 minute icing" recipe, at least the whites from two eggs (about 8.0 g. of dry albumen) would be required. The examples set forth above employ only about 2.5 g. of whippable material and, of course, the proportionate difference in the amounts of these materials to be used remains the same when greater or lesser amounts of icing are prepared. This unexpected effectiveness of the cellulose ether in combination with the whippable protein makes possible a dry mix having all the quality and convenience factors noted herein but which is nevertheless competitive price-wise with the icings of this type made in the home.

EXAMPLE 6

| Ingredient | Wt./package, g. |
|---|---|
| Methyl cellulose, 25 cps | 2.0 |
| Partially hydrolyzed soy protein (as hereinbefore described) | 3.0 |
| Sodium alginate (containing 25% calcium carbonate) | 1.8 |
| Granulated sucrose | 210.0 |
| Starch (tapioca) | 12.0 |
| Cream of tartar | 1.0 |
| | 229.8 |

EXAMPLE 7

| Ingredient | Wt./package, g. |
|---|---|
| Methyl cellulose, 25 cps | 2.0 |
| Partially hydrolyzed soy protein (as hereinbefore described) | 3.0 |
| Sodium alginate (containing 25% calcium carbonate) | 1.8 |
| Ground sucrose (6X) | 210.0 |
| Gelatinized starch (tapioca) | 12.0 |
| D-glucono lactone | 1.0 |
| | 229.8 |

EXAMPLE 8

| Ingredient | Wt./package, g. |
|---|---|
| Methyl cellulose, 25 cps | 4.0 |
| Partially hydrolyzed soy protein (as hereinbefore described) | 2.0 |
| Potassium alginate (containing 25% calcium carbonate) | 1.6 |
| 4X sugar | 220.0 |
| Gelatinized tapioca starch | 11.0 |
| D-glucono lactone | 1.6 |
| Sodium chloride | .75 |
| | 240.95 |

In preparing the mixes shown in Examples 6, 7 and 8 above, 1 cup (240 cc.) of cold water is added to all of the ingredients and the mixture whipped in a Sunbeam mixer at speed No. 10 for 3 minutes. A topping having the excellent handling characteristics and the greatly improved stability of Examples 1–5 is provided and the topping is stable for at least 3 days. Although the amount of cellulose ether and whippable protein has been increased to provide a product which can be prepared in a single step, the amount of these materials is still less than the amount of egg white necessary to provide the same amount of icing. Moreover, it would be very difficult to make a conventional "7 minute" icing in the home in a single step even with the application of heat. Commercial egg white products are available in a single package, but these require heat to stabilize the icing.

In Example 8, it is noted that sodium chloride has been employed for the purpose of improving the flavor of the icing. In this case, potassium alginate is also employed to provide improved stability and texture, with a minimum amount of alginate.

While this invention has been described with particular reference to the above examples, it should be understood that the invention is not limited thereto and reference should be had to the appended claims for a definition of the limits of the invention.

This application is a continuation-in-part of our co-pending application entitled Confectionary Product and Process, Serial No. 391,368, filed November 10, 1953, now abandoned.

What is claimed is:

1. A whipping composition comprising a whippable protein and a water soluble non-ionic alkyl ether of cellulose, and a foam stabilizer.

2. A whipping composition comprising a whippable protein and a water soluble non-ionic alkyl ether of cellulose, a foam stabilizer, and an edible diluent.

3. A dry mix for use in preparing whipped products comprising a whippable protein, a water soluble non-ionic alkyl ether of cellulose, a foam stabilizer, and sugar.

4. The composition of claim 3, wherein the water soluble non-ionic alkyl ether of cellulose is methyl cellulose.

5. The composition of claim 3 wherein the water soluble non-ionic alkyl ether of cellulose is methyl ethyl cellulose.

6. The composition of claim 3 wherein the water soluble non-ionic alkyl ether of cellulose is hydroxy propyl methyl cellulose.

7. The composition of claim 3 wherein the water soluble non-ionic alkyl ether of cellulose is ethyl cellulose.

8. The composition of claim 3 wherein the water soluble non-ionic alkyl ether of cellulose is hydroxy ethyl cellulose.

9. A dry mix for use in preparing whipped products comprising partially hydrolyzed soy protein, methyl cellulose, sugar, and a foam stabilizer.

10. The composition of claim 9 wherein the foam stabilizer comprises sodium alginate, calcium carbonate and delta glucono lactone.

11. A whipped topping comprising water, whippable protein, a water soluble non-ionic alkyl ether of cellulose and a foam stabilizer.

12. A whipped topping comprising a partially hydrolyzed soy protein, a water soluble non-ionic alkyl ether of cellulose, sugar, a foam stabilizer, and water.

13. A whipped topping comprising partially hydrolyzed soy protein, methyl cellulose, sugar, and a foam stabilizing system comprising sodium alginate, calcium carbonate, and delta glucono lactone.

14. A whipped topping comprising a partially hydrolyzed soy protein, methyl cellulose, sugar, sodium chloride, and a foam stabilizing system comprising potassium alginate, calcium carbonate and delta glucono lactone.

15. A dry mix for use in preparing whipped toppings comprising partially hydrolyzed soy protein, methyl cellulose, sodium alginate, calcium carbonate, delta glucono lactone, pre-gelatinized starch and sugar, said soy protein and methyl cellulose being present in a ratio of from 7:3 to 1:9 parts by weight respectively.

References Cited in the file of this patent

UNITED STATES PATENTS

| | | |
|---|---|---|
| 2,271,654 | Littlefield | Feb. 3, 1942 |
| 2,441,729 | Steiner | May 18, 1948 |
| 2,474,019 | Steiner et al. | June 21, 1949 |
| 2,588,419 | Sevall et al. | Mar. 11, 1952 |
| 2,604,406 | Blihovde | July 22, 1952 |
| 2,664,422 | Downing et al. | Dec. 29, 1953 |